(12) United States Patent
Fan

(10) Patent No.: US 11,256,756 B2
(45) Date of Patent: Feb. 22, 2022

(54) CHARACTER STRING DISTANCE CALCULATION METHOD AND DEVICE

(71) Applicant: Advanced New Technologies Co., Ltd., George Town (KY)

(72) Inventor: Xiaofeng Fan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 411 days.

(21) Appl. No.: 16/107,027

(22) Filed: Aug. 21, 2018

(65) Prior Publication Data

US 2018/0357332 A1 Dec. 13, 2018

Related U.S. Application Data

(63) Continuation of application No. PCT/CN2017/073134, filed on Feb. 9, 2017.

(30) Foreign Application Priority Data

Feb. 22, 2016 (CN) .......................... 201610096589.9

(51) Int. Cl.
*G06F 16/903* (2019.01)
*G06F 16/215* (2019.01)
(Continued)

(52) U.S. Cl.
CPC ...... *G06F 16/90344* (2019.01); *G06F 16/215* (2019.01); *G06F 16/2237* (2019.01);
(Continued)

(58) Field of Classification Search
None
See application file for complete search history.

(56) References Cited

U.S. PATENT DOCUMENTS

| 4,288,779 A | 9/1981 | Otsu et al. |
| 5,774,588 A * | 6/1998 | Li .......................... G06K 9/723 |
| | | 382/230 |

(Continued)

FOREIGN PATENT DOCUMENTS

| CN | 101572693 | 11/2009 |
| CN | 103455753 | 12/2013 |

(Continued)

OTHER PUBLICATIONS

International Preliminary Report on Patentability in International Application No. PCT/CN2017/073134 dated Apr. 28, 2017; 8 pages.

(Continued)

*Primary Examiner* — Neveen Abel Jalil
*Assistant Examiner* — John J Morris
(74) *Attorney, Agent, or Firm* — Fish & Richardson P.C.

(57) ABSTRACT

Techniques for determining character string differences between a target character string and one or more candidate character strings are provided. In some implementations, a target bitmap is produced for the target character string and a target bitmap weight is calculated. A candidate bitmap and a candidate bitmap weight associated with a candidate character string is obtained. In response to determining that the candidate bitmap weight differs from the target bitmap weight by less than a first threshold value, an exclusive OR operation is performed between the target bitmap and the candidate bitmap. In response to determining that number of ones in the result of the exclusive OR is less than a second threshold value, the candidate character string is included in a character set that includes one or more character strings that are close to the target character string.

20 Claims, 9 Drawing Sheets

(51) Int. Cl.
*G06F 16/22* (2019.01)
*G06F 16/31* (2019.01)
*G06F 16/33* (2019.01)
*G06K 9/62* (2006.01)

(52) U.S. Cl.
CPC .......... *G06F 16/313* (2019.01); *G06F 16/334* (2019.01); *G06K 9/6215* (2013.01)

(56) References Cited

U.S. PATENT DOCUMENTS

| | | | |
|---|---|---|---|
| 9,501,557 | B2* | 11/2016 | Kataoka ................ G06F 16/313 |
| 2005/0086234 | A1* | 4/2005 | Tosey .................. G06F 16/2237 |
| 2009/0175520 | A1 | 7/2009 | Huynh et al. |
| 2009/0234826 | A1* | 9/2009 | Bidlack ................. G06F 16/215 |
| 2010/0257159 | A1* | 10/2010 | Uematsu ............... G06F 16/334 |
| | | | 707/723 |
| 2013/0185327 | A1* | 7/2013 | Biesenbach ........... G06F 16/334 |
| | | | 707/769 |
| 2017/0147650 | A1* | 5/2017 | Hattori .................... H04L 67/02 |

FOREIGN PATENT DOCUMENTS

| | | |
|---|---|---|
| CN | 103838789 | 6/2014 |
| CN | 104008119 | 8/2014 |
| CN | 104462055 | 3/2015 |
| CN | 104484391 | 4/2015 |
| CN | 105117466 | 12/2015 |
| JP | 2008102641 | 5/2008 |
| JP | 2009271584 | 11/2009 |
| WO | WO 9641280 | 12/1996 |

OTHER PUBLICATIONS

Cohen et al., "A Comparison of String Metrics for Matching Names and Records," KDD Workshop on Data Cleaning and Object Consolidaiton, Aug. 2003, 6 pages.

Crosby et al., "BlockChain Technology: Beyond Bitcoin," Sutardja Center for Entrepreneurship & Technology Technical Report, Oct. 16, 2015, 35 pages.

Extended European Search Report in European Application No. 17755736.0, dated Jul. 1, 2019, 8 pages.

Loo., "The stringdist Package for Approximate String Matching," The R Journal, Jan. 1, 2014, 6(1): 111-122.

Nakamoto, "Bitcoin: A Peer-to-Peer Electronic Cash System," www.bitcoin.org, 2005, 9 pages.

Yang, "Hanmming Weight and Hamming Distance," Practical Error Correction Coding for Teaching Reference Books in Colleges and Universities, Mar. 1988, p. 30 (with machine translation).

International Search Report Issued by the International Searching Authority in International Application No. PCT/CN2017/073134 dated Apr. 28, 2017; 9 pages.

Ito, "Algorithms and Data Structures for Creating Spell Fixes Series 2," Gihyo Direct, Jul. 25, 2009, 51:130-136 (with English translation).

* cited by examiner

CHARACTER STRING DISTANCE CALCULATION METHOD AND DEVICE

This application is a continuation of PCT Application No. PCT/CN2017/073134, filed on Feb. 9, 2017, which claims priority to Chinese Patent Application No. 201610096589.9, filed on Feb. 22, 2016, and each application is hereby incorporated by reference in its entirety.

TECHNICAL FIELD

The present application relates to network technologies, and in particular, to a character string distance calculation method and device.

BACKGROUND

Character string distance calculation can be used to determine similarity between two character strings. For example, to identify a character string in a character string set similar to a given target character string, a distance between the target character string and each character string in the set can be calculated, and a character string whose distance to the target character string is less than a predetermined distance threshold is determined as a character string similar to the target character string. However, running time costs are high in this method when there is a large number of character strings in the character string set. For example, a long running time is needed when a record similar to a given address is being searched for in a database including tens of millions of addresses. As a result, an application requirement for quickly obtaining a result may not be satisfied.

SUMMARY

In view of this, the present application provides a character string distance calculation method and device, to improve calculation efficiency when a similar character string is searched for in a candidate character string set through character string distance calculation.

The present application is implemented using the following technical solutions:

A first aspect provides a character string distance calculation method, where the method is used to select a candidate character string similar to a given target character string from a candidate character string set, and the method includes: obtaining association bitmap information of the candidate character string and the target character string, where the association bitmap information includes at least one of bitmap weights of two character string bitmaps corresponding to the candidate character string and the target character string, or a bitmap weight of a bitmap difference between two character string bitmaps; and screening out, based on the association bitmap information, a candidate character string whose character string distance to the target character string is greater than a distance threshold in the candidate character string set, and calculating a character string distance between each remaining candidate character string and the target character string, where the character string bitmap includes a plurality of flag bits, a value of the flag bit includes a first value and a second value, the first value indicates that a predetermined standard character corresponding to the flag bit is included in a character string, the second value indicates that a predetermined standard character corresponding to the flag bit is not included in the character string, the bitmap weight of the character string bitmap indicates the number of first values in the character string bitmap, the bitmap difference is obtained by performing an exclusive OR operation on a value of each flag bit in the target character string bitmap and a value of a corresponding flag bit in the candidate character string bitmap, and the bitmap weight of the bitmap difference indicates the number of flag bits whose exclusive OR values are true in the bitmap difference.

A second aspect provides a character string distance calculation method, where the method is used to select a candidate character string similar to a given target character string from a candidate character string set, and the method includes: obtaining character difference information of characters included in the candidate character string and the target character string; and if the character difference information is greater than a difference threshold, screening out the candidate character string from the candidate character string set, and calculating a character string distance between each remaining candidate character string in the candidate character string set and the target character string.

A third aspect provides a character string distance calculation device, where the device is configured to select a candidate character string similar to a given target character string from a candidate character string set, and the device includes: an information acquisition module, configured to obtain association bitmap information of the candidate character string and the target character string, where the association bitmap information includes at least one of bitmap weights of two character string bitmaps corresponding to the candidate character string and the target character string, or a bitmap weight of a bitmap difference between two character string bitmaps, the character string bitmap includes a plurality of flag bits, a value of the flag bit includes a first value and a second value, the first value indicates that a predetermined standard character corresponding to the flag bit is included in a character string, the second value indicates that a predetermined standard character corresponding to the flag bit is not included in the character string, the bitmap weight of the character string bitmap indicates the number of first values in the character string bitmap, the bitmap difference is obtained by performing an exclusive OR operation on a value of each flag bit in the target character string bitmap and a value of a corresponding flag bit in the candidate character string bitmap, and the bitmap weight of the bitmap difference indicates the number of flag bits whose exclusive OR values are true in the bitmap difference; and a screening module, configured to screen out, based on the association bitmap information, a candidate character string whose character string distance to the target character string is greater than a distance threshold in the candidate character string set, and calculate a character string distance between each remaining candidate character string and the target character string.

A fourth aspect provides a character string distance calculation device, where the device is configured to select a candidate character string similar to a given target character string from a candidate character string set, and the device includes: a difference acquisition module, configured to obtain character difference information of characters included in the candidate character string and the target character string; and a distance calculation module, configured to: if the character difference information is greater than a difference threshold, screen out the candidate character string from the candidate character string set, and calculate a character string distance between each remaining candidate character string in the candidate character string set and the target character string.

The present application provides character string distance calculation method and device. Some candidate character strings are screened out in advance from the candidate character string set based on the character distance information of the characters included in the candidate character string and the target character string, for example, the association bitmap information. Afterwards, the character string distance between the remaining candidate character string and the target character string is calculated. Therefore, a size of the set is greatly reduced when the similar character string is searched for in the candidate character string set through character string distance calculation, thereby improving calculation efficiency.

DESCRIPTION OF IMPLEMENTATIONS

Example implementations are described in detail here, and an example of the implementations is indicated in the accompanying drawings. When the following descriptions relate to the accompanying drawings, the same number in different accompanying drawings indicates the same or similar element unless another indication is stated. Implementation methods described in the following example implementations do not represent all implementation methods consistent with the present application. Instead, these implementation methods are merely examples of devices and methods consistent with some aspects described in detail in the claims of the present application.

Character string distance calculation is widely used. For example, in an application scenario, similarity between two character strings is determined by calculating a character string distance between the two character strings during data analysis. For example, assuming that an address character string is given, a character string distance between the given address character string and each character string in an address character string set can be calculated to determine whether there is a character string similar to the given address character string in the set. If the character string distance falls within the range of a distance threshold, the character string in the set is similar to the given address character string.

If comparing with the given character string, the size of the character string set is large, for example, the previous address character string set includes tens of thousands of address character strings, running time costs are high during character string distance calculation. To quickly obtain a result of the character string distance calculation, and to better satisfy an application requirement for fast running, an implementation of the present application provides a character string distance calculation method. Such method is intended to quickly obtain a calculation result even when character string distance calculation is performed in a large character string set.

In the present implementation, the given address character string can be referred to as a "target character string", the address character string set can be referred to as a "candidate character string set", and each address character string in the candidate character string set can be referred to as a "candidate character string".

Figure 1:
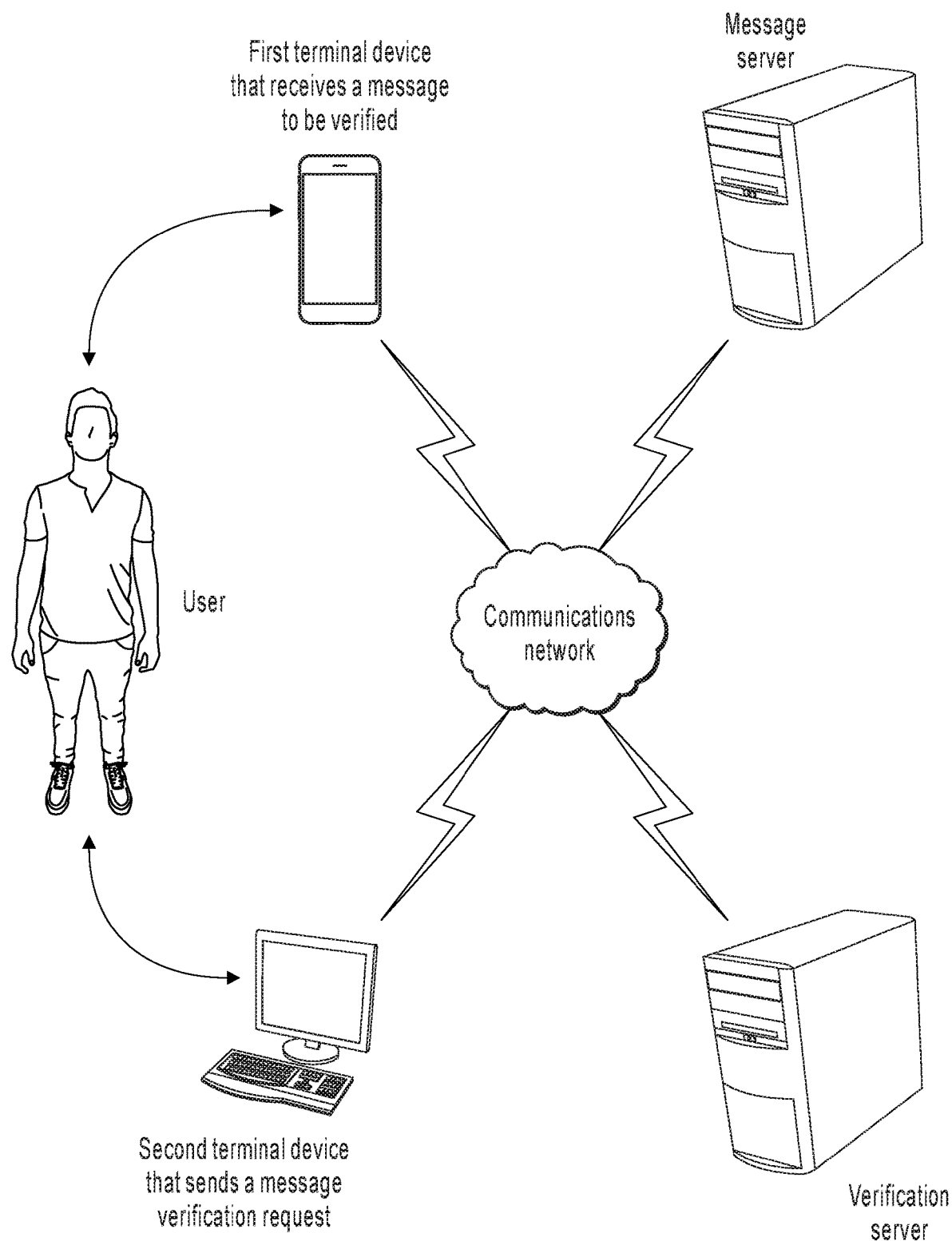
FIG. 1 is a flowchart illustrating a character string distance calculation method, according to an example implementation of the present application.

Based on the character string distance calculation method in the present application, a procedure shown in FIG. 1 can be used to select a candidate character string similar to a given target character string from a candidate character string set.

Step 101: Obtain character difference information of characters included in the candidate character string and the target character string.

For example, if the target character string is AA, and a candidate character string in the candidate character string set is ABCD, the character difference information described in the present step can be a difference between the number of different characters included in the target character string and the number of different characters included in the candidate character string. For example, the candidate character string includes four different characters A, B, C, and D, and the target character string includes one type of character A.

If the number of different characters included in the candidate character string is referred to as a first character quantity, and the number of different characters included in the target character string is referred to as a second character quantity, a difference between the first character quantity and the second character quantity is 3, that is, the character difference information is 3. In such case, the character difference information can indicate the difference between the number of different characters included in the target character string and the number of different characters included in the candidate character string.

For another example, the character difference information can further include the number of different characters when the two character strings are comprehensively compared with each other. For example, when the candidate character string ABCD is compared with the target character string AA, A is the same character included in the two character strings, and B exists only in the candidate character string and is one of different characters. Likewise, C and D are also different characters included in only the candidate character string instead of the target character string. Therefore, there are three different characters B, C, and D when the candidate character string is compared with the target character string. A third character quantity can be used to indicate the number of characters included in only one of the candidate character strings and the target character string. The third character quantity is the character difference information obtained in the present step.

Step 102: Screen out, based on the previously calculated character difference information, some candidate character strings from the candidate character string set that are determined to be different from the target character string.

The difference between the first character quantity and the second character quantity is calculated in step 101. A large difference indicates that the candidate character string is different from the target character string. For example, the difference between the first character quantity and the second character quantity is 3 based on the target character string AA and the candidate character string ABCD. If the difference threshold is 1, it can be determined that the two character strings are different from each other.

For another example, if the third character quantity is greater than the difference threshold, it indicates that the candidate character string includes a large number of characters different from characters included in the target character string, that is, the two character strings are different from each other. Therefore, the candidate character string can be screened out.

For still another example, candidate character strings different from the target character string can be screened out more accurately and comprehensively based on the first character quantity, the second character quantity, and the third character quantity. For example, the candidate character string is screened out from the candidate character string set if the difference between the first character quantity and the second character quantity is greater than the difference threshold. Afterwards, screening is performed based on the third character quantity on a remaining candidate character string in the candidate character string set after the screening. The remaining candidate character string is screened out from the candidate character string set if the third character quantity is greater than the difference threshold.

For example, assuming that the target character string is AA, and the candidate character string is BB, a difference between the first character quantity and the second character quantity is 0 because the target character string and the candidate character string each includes one type of character. Therefore, the candidate character string cannot be screened out based on the difference. However, if the third character quantity is further calculated, the third character quantity is 2 because different characters include A and B. When the distance threshold is 1, the candidate character string is screened out because the third character quantity is greater than the distance threshold.

Based on the character string distance calculation method in the present implementation, some candidate character strings obviously different from the target character string are screened out first based on the character difference information before the character string distance calculation. Afterwards, a distance between a remaining candidate character string obtained after the screening and the target character string is calculated. Therefore, the candidate character strings are greatly reduced in final character string distance calculation, thereby improving calculation efficiency.

The character difference information can be obtained in a plurality of methods. For example, the difference information is obtained by comparing the character strings character by character. The following implementation of the present application provides an example character difference information acquisition method. In this method, the candidate character string and the target character string can be represented using character string bitmaps, and the character difference information can be obtained based on the character string bitmaps, so that the character difference information is quickly obtained, and processing efficiency is improved.

The character difference information acquisition method based on a character string bitmap applies to the following concepts. Before the method is described in detail, these concepts are explained in the following:

Character string bitmap: For example, a bitmap including a plurality of flag bits can be predetermined, and each flag bit corresponds to one character, for example, English letters A, B, C, . . . , Y, and Z. A character corresponding to a flag bit in the bitmap can be referred to as a predetermined standard character in the present implementation. The following table 1 shows an example of a bitmap structure.

TABLE 1

| Bitmap structure | | | | | | |
|---|---|---|---|---|---|---|
| | Character corresponding to a flag bit | | | | | |
| | Z | ... | E | D | C | B | A |
| Value of the flag bit | 0 | | 0 | 1 | 0 | 1 | 1 |

Referring to table 1, it is assumed that there are 26 flag bits in total corresponding to 26 English letters. The flag bits sequentially correspond to characters A, B, C, . . . , and Z from right to left. A value of each flag bit can be a first value or a second value. For example, in the present implementation, the first value is set to 1, and the second value is set to 0. A rule for setting a value can be as follows: determining whether a character corresponding to a flag bit is in a character string when a bitmap of the character string is calculated; and if yes, setting the value of the flag bit to 1; or if no, setting the value of the flag bit to 0. After values of all the flag bits are set, the character string bitmap is obtained. The rule for setting a value further includes: if the character corresponding to the flag bit appears at least twice in the character string, still setting the value of the flag bit to 1.

In an example, it is assumed that a bitmap of a character string "DABA" needs to be calculated. Referring to table 1, whether a predetermined standard character corresponding to each flag bit in the bitmap is in the character string can be determined to identify values of flag bits from right to left.

Preset the value of the flag bit corresponding to the standard character A: A character A exists in the character string "DABA". A value of a flag bit corresponding to the predetermined standard character A is set to 1. Even if A appears twice and the character string includes two As, the value is still set to 1.

Preset the value of the flag bit corresponding to the standard character B: A character B exists in the character string "DABA". A value of a flag bit corresponding to the predetermined standard character B is set to 1.

Preset the value of the flag bit corresponding to the standard character C: A character C does not exist in the character string "DABA". A value of a flag bit corresponding to the predetermined standard character C is set to 0.

Preset the value of the flag bit corresponding to the standard character D: A character D exists in the character string "DABA". A value of a flag bit corresponding to the predetermined standard character D is set to 1.

Values of other flag bits are set according to the previous rule, and details are not described here. Eventually, a value of a bitmap including 26 flag bits in the structure shown in table 1 can be 0000 . . . 001011, that is, a value shown in table 1. The value can be simplified as "1011" with a preceding string of 0s omitted, and the character string bitmap corresponding to the character string "DABA" is "1011".

It can be seen from the previously explained content that the character string bitmap includes a plurality of flag bits, and the value of each flag bit indicates whether a character corresponding to the flag bit is included in the character string. If the value of the flag bit is the first value, it indicates that the character corresponding to the flag bit is in the character string. If the value of the flag bit is the second value, it indicates that the character corresponding to the flag bit is not in the character string. The character string bitmap related to the descriptions of the method in the following implementations can be calculated using the previous method. In addition, in the descriptions of the method in the following implementations, the character string bitmap is sometimes referred to as a bitmap. For example, a bitmap of the target character string and a bitmap of the candidate character string are both referred to as character string bitmaps.

In addition, the predetermined standard character corresponding to a flag bit is not necessarily in the structure shown in table 1 and can be in another structure for the character string bitmap calculation. For example, the character can be an example shown in table 2 where characters from A, B, and C to Z are arranged from left to right; or other predetermined standard characters can be used.

TABLE 2

| Bitmap structure | | | | | | |
|---|---|---|---|---|---|---|
| Character corresponding to a flag bit | | | | | | |
| | A | B | C | D | E | ... Z |
| Value of the flag bit | 0 | 1 | 0 | 1 | 0 | 1 |

It is worthwhile to note that, in the previous example, a 26-bit bitmap structure corresponding to 26 English letters is used as an example. In actual application, another bitmap structure of less than 32 bits can also be used. Such bitmap structure design of less than 32 bits is mainly intended for quick bitmap calculation, to improve an operation speed. Therefore, the bitmap structure is not designed to be too large. However, a larger data structure can also be used to store a bitmap if the character set is not too large. For example, if a Japanese character string needs to be processed, a bitmap can be expressed using a 128-bit large integer structure.

In addition, in the previous example, a character corresponding to each flag bit in the bitmap structure is described using an uppercase English letter. To extend the application scope of the method in the present application, preprocessing can be performed on a character string including characters other than the 26 uppercase English letters, so that the method can be applied to the character string. The preprocessing method includes, but is not limited to: ignoring punctuation such as a space in a character string waiting to be processed, and transforming some non-English letters into corresponding English letters using the UNICODE NFKD standard. For example, "café" is transformed into "cafe", and all lowercase English letters are transformed into corresponding uppercase English letters.

Bitmap weight: The bitmap weight is the number of first values in a character string bitmap. For example, in the previous example, the character string "DABA" corresponds to the characters string bitmap "1011" when the character string bitmap is calculated based on the structure in table 1, and the number of first values 1 in the character string bitmap is used as the bitmap weight. The bitmap weight of the character string bitmap "1011" is 3 because the character string bitmap includes three 1s.

Bitmap difference: The bitmap difference is obtained after a binary exclusive "OR" operation is performed on character string bitmaps of two character strings. For example, a bitmap difference between two bitmaps "1011" and "0111" is calculated. "1011" can be referred to as a first bitmap, and "0111" can be referred to as a second bitmap. The two bitmaps each include four flag bits. Each flag bit in the first bitmap can be referred to as a first flag bit, and each flag bit in the second bitmap is referred to as a second flag bit. The previous "first" or "second" is merely for differentiation. Reference is made to the following table 3.

TABLE 3

| Mapping relationship between flag bits in two bitmaps | | | | |
|---|---|---|---|---|
| First flag bit | 1 | 0 | 1 | 1 |
| Second flag bit | 0 | 1 | 1 | 1 |
| Exclusive OR value | 1 | 1 | 0 | 0 |

It can be seen from table 3 that each first flag bit corresponds to one second flag bit. An exclusive OR operation can be performed on a value of a first flag bit and a value of a corresponding second flag bit. For example, an exclusive OR value of the first flag bit "1" and the second flag bit "0" is "1", and an exclusive OR value of the first flag bit "1" and the second flag bit "1" is "0". A rule of the exclusive OR operation is as follows: an exclusive OR value of two different values is 1 (the exclusive OR value is true), and an exclusive OR value of two same values is 0 (the exclusive OR value is false). An eventually obtained exclusive OR value "1100" corresponding to all the flag bits is a bitmap difference.

It can be seen that the bitmap difference is actually a bitmap, the bitmap difference also includes a plurality of flag bits, and a value of each flag bit indicates whether a value of a first flag bit is the same as a value of a second flag bit.

Weight of a bitmap difference: Because the bitmap difference is also a bitmap, a weight of a bitmap difference and a weight of a bitmap are calculated using the same method. For example, a weight of the bitmap difference "1100" is "2", that is, the weight of the bitmap difference indicates the number of flag bits whose exclusive OR values are true in the bitmap difference.

Character string distance: The character string distance indicates the minimum number of characters to be added, deleted, or replaced when a character string is changed to another character string. For example, a distance between "ABCEF" and "ACDEG" is 3, and the modification is to delete B, add D, and replace F with G. Some conventional distance calculation algorithms can be used to calculate a character string distance, for example, a Levenshtein distance algorithm, which is not described in detail.

Figure 2:
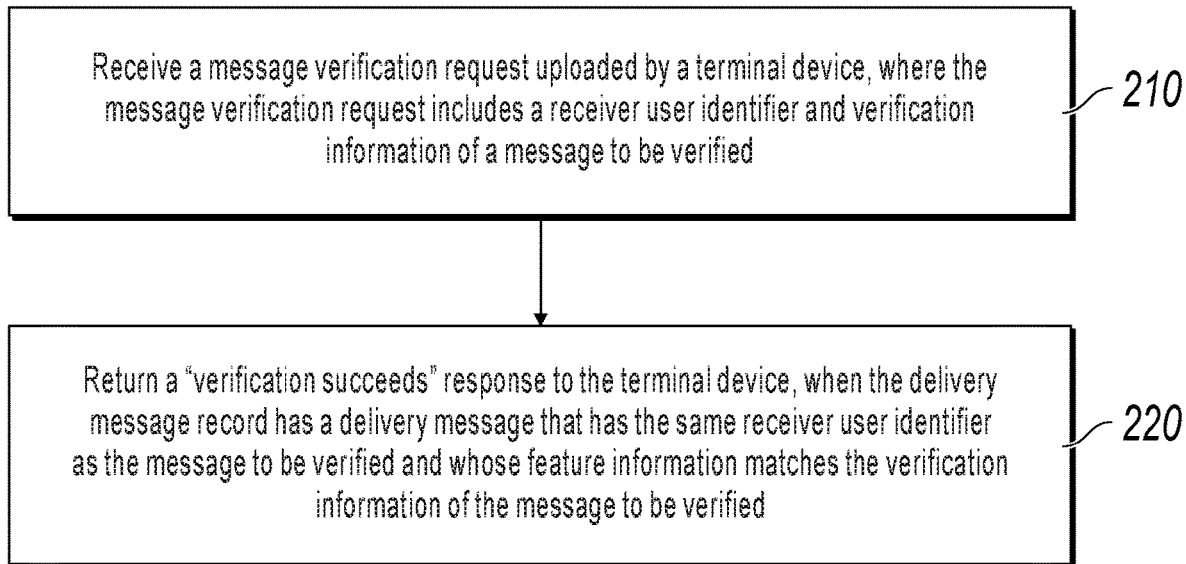
FIG. 2 is a flowchart illustrating a character string distance calculation method, according to an example implementation of the present application.

The following describes the character string distance calculation method according to the implementations of the present application. The method relates to the previously described bitmap, the bitmap weight, the bitmap difference, etc. The method in the present implementation is shown in FIG. 2.

Step 201: Obtain association bitmap information of a candidate character string and a target character string. The association bitmap information can include bitmap weights of two character string bitmaps corresponding to the candidate character string and the target character string, or a bitmap weight of a bitmap difference between two character string bitmaps of the candidate character string and the target character string.

Step 202: Screen out, from a candidate character string set based on the association bitmap information obtained in step 201, a candidate character string "obviously different" from the target character string, and then calculate a distance between a remaining candidate character string obtained after the screening and the target character string. Based on the previous explanations for the concepts such as the bitmap weight and the bitmap difference, the bitmap weight can indicate the number of different characters included in character strings, or can indicate a difference of characters included in two character strings. If the two character strings are obviously different from each other, that is, characters included in one character string are obviously different from characters included in the other character string, the difference can be reflected using the bitmap weight, to identify different character strings.

Based on the character distance calculation method in the present implementation, some candidate character strings obviously different from the target character string are screened out using the bitmap weight. The number of character strings involved in character string distance calculation is greatly reduced using this method compared with the method of directly calculating a distance between the target character string and each character string in the candidate character string set, thereby improving a speed of searching for a similar character string.

The following lists several examples of performing screening based on the association bitmap information of the candidate character string and the target character string.

In an example, screening can be performed on the character string based on bitmap weights of two character string bitmaps corresponding to the candidate character string and the target character string. If a difference between the bitmap weight of the character string bitmap corresponding to the candidate character string and the bitmap weight of the character string bitmap corresponding to the target character string is greater than the distance threshold, it is determined that the candidate character string is different from the target character string, and the candidate character string is screened out before the character string distance calculation being performed between the candidate character string and the target character string. In such case, the difference between the bitmap weights of the two character string bitmaps of the candidate character string and the target character string is the character difference information.

For example, it is assumed that the distance threshold in the character string distance calculation is 1, the target character string is "ABCD", the bitmap of the character string is "1111", and the bitmap weight is 4. It is assumed that a candidate character string is "AAAA", the bitmap of the candidate character string is "1", and the bitmap weight is 1. The difference between the two bitmap weights is 4−1=3, and the candidate character string "AAAA" is screened out because the difference 3 is greater than the distance threshold 1.

It can be seen from the previous example that: If the weight difference between the bitmap weights of the character string bitmaps of the two character strings is large, it indicates that the two character strings are greatly different (or "obviously different") from each other, and the candidate character string can be screened out.

In another example, screening can be performed on the character string based on the bitmap weight of the bitmap difference between the two character string bitmaps corresponding to the candidate character string and the target character string. The candidate character string is screened out if the bitmap weight of the bitmap difference between the two character string bitmaps corresponding to the candidate character string and the target character string is greater than the distance threshold. In such case, the bitmap weight of the bitmap difference between the two character string bitmaps of the candidate character string and the target character string is the character difference information.

In this example, a character string obviously different from the target character string can be screened out based on the weight of the bitmap difference. For example, the target character string is "ABC". If the candidate character string is "CD", a bitmap difference between the two character strings is calculated. A bitmap of "ABC" is 0111, and a bitmap of "CD" is 1100. An exclusive OR operation is performed on the two bitmaps to obtain a bitmap difference 1011. The weight of the bitmap difference is 3. The candidate character string "CD" can be screened out because the weight 3 of the bitmap difference is greater than the distance threshold 1.

It can be seen from the previous example that the difference between the two character strings can be identified based on the weight of the bitmap difference even if the number of different characters in the candidate character string is similar to the number of different characters in the target character string, but the characters are completely different characters.

In the previous two examples, a character string different from the target character string can be screened out based on the weights of the character string bitmaps or the weight of the bitmap difference when screening is performed on the character string based on the bitmap weight. In still another example, screening can be performed on the character string based on the bitmap weights of the two character string bitmaps of the candidate character string and the target character string and the bitmap weight of the bitmap difference between the two character string bitmaps, so as to obtain a better screening effect.

For example, if the target character string is "ABC", and the candidate character string is "CD", a bitmap of "ABC" is 0111, a bitmap of "CD" is 1100, and a difference between bitmap weights of the character string bitmaps of the two character strings is 3−2=1, which is within the range of the distance threshold 1. However, if a bitmap difference between the two character strings is calculated, the weight of the bitmap difference 1011 is 3, which is greater than the distance threshold 1, and therefore the candidate character string "CD" can be determined to be different from the target character string and can be screened out.

Figure 3:
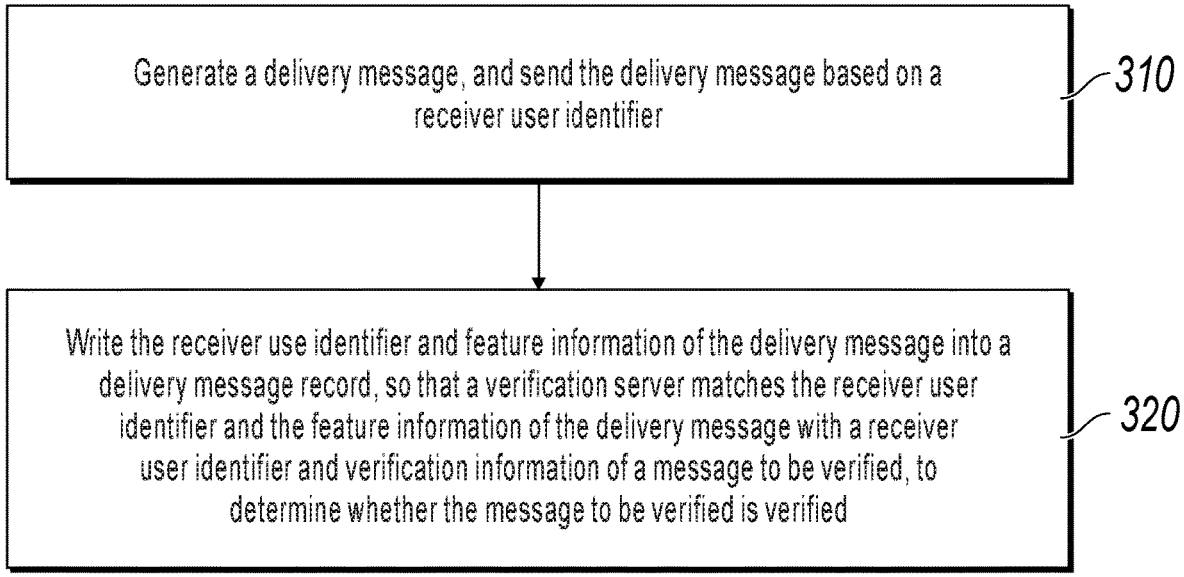
FIG. 3 is a flowchart illustrating a character string distance calculation method, according to an example implementation of the present application.

FIG. 3 shows an example of a procedure of a character string distance calculation method, according to an example implementation of the present application. In this example, screening is performed on a character string based on both the bitmap weights of two character string bitmaps and a bitmap weight of a bitmap difference.

First, a bitmap and a bitmap weight corresponding to each candidate character string in a candidate character string set in a database are calculated and then stored in the database. When the bitmap is calculated, calculation costs are O(N), and N is a character string length. When the bitmap weight is calculated, calculation costs are O(0), and the weight can be calculated using the MIT HAKMEM algorithm. Refer to the previous concept explanation part for the bitmap calculation and the bitmap weight calculation. Details are not described again. The bitmaps of all the candidate character strings in the candidate character string set can be stored in a column, that is, a bitmap column in the database, and the bitmap weights of all the candidate character strings can be stored in another column, that is, a weight column in the database. An index is set for the weight column, to enable fast searching based on the index in a later calculation process.

Step 301: When a given target character string is received, and a character string similar to the target character string needs to be selected from a candidate character string set, calculate a character string bitmap and a corresponding bitmap weight of the target character string, where the calculation costs are also O(N) and O(0), respectively.

Step 302: Screen out a candidate character string from the candidate character string set based on a prestored bitmap weight of a character string bitmap of the candidate character string, to obtain a first candidate character string set.

As such, some candidate character strings that are obviously different from the target character string can be screened out from the candidate character string set based on the bitmap weight of the character string bitmap. A weight difference between the bitmap weight of the candidate character string and the bitmap weight of the target character string is obtained, and the weight difference is compared with a distance threshold in the character string distance calculation. If the weight difference falls within a range of the distance threshold, the candidate character string belongs to the first candidate character string set; otherwise, the candidate character string is screened out and does not belong to the first candidate character string set.

For example, it is assumed that the distance threshold is 1, the target character string is "ABCD", the bitmap of the character string is "1111", and the bitmap weight is 4. It is assumed that a candidate character string is "AB", the bitmap of the candidate character string is "11", and the bitmap weight is 2. The difference between the two bitmap weights is 4−2=2. The candidate character string "AB" is screened out and does not belong to the first candidate character string set because the difference 2 is greater than the distance threshold 1. In addition, running costs in calculating the weight difference and comparing the weight difference with the distance threshold in the present step are O(0).

In the present step, some candidate character strings obviously different from the target character string can be screened out based on bitmap weights of character string bitmaps of the candidate character strings, and the first candidate character string set can be obtained. However, the first candidate character string set can still include some candidate character strings that are different from the target character string.

For example, the target character string is "ABC". If the candidate character string is "CD", a difference between two bitmap weights is 3−2=1, and the weight difference 1 is equal to the distance threshold 1 and satisfies the threshold requirement. Therefore, the candidate character string is classified into the first candidate character string set. However, it is obvious that the "ABC" and "CD" are two different character strings. Therefore, step 303 can be performed in this example.

Step 303: Calculate a bitmap difference between two character string bitmaps of each candidate character string in the first candidate character string set and the target character string, and calculate a bitmap weight of the bitmap difference; and screen out the candidate character string based on the bitmap weight of the bitmap difference, to obtain a second candidate character string set.

In the present step, determining and screening are further performed on each candidate character string in the first candidate character string set, to obtain the second candidate character string set. The screening in the present step is based on the weight of the bitmap difference. The weight of the bitmap difference can reflect a detailed difference between two bitmaps. Each candidate character string in the second candidate character string set satisfies the condition that a weight of a bitmap difference between a bitmap of the candidate character string and a bitmap of the target character string falls within the range of the distance threshold. The running costs of the present step are also O(0), and the operation can be completed through a fixed step.

In the previous example, the target character string is "ABC", and the candidate character string is "CD". The bitmap weight difference between the two character strings satisfies the threshold requirement, and the candidate character string is classified into the first candidate character string set. In the present step, the bitmap difference of the two character strings is calculated. A bitmap of "ABC" is 0111, and a bitmap of "CD" is 1100. An exclusive OR operation is performed on the two bitmaps to obtain a bitmap difference 1011. The weight of the bitmap difference is 3. The candidate character string "CD" can be screened out because the weight 3 of the bitmap difference is greater than the distance threshold 1. The second candidate character string set is obtained after the screening operation is performed on the first candidate character string set in the present step.

Step 304: Calculate a character string distance between the target character string and each candidate character string in the second candidate character string set, and select a candidate character string whose character string distance to the target character string falls within the range of the distance threshold.

In the present step, the character string distance between the target character string and each candidate character string in the second candidate character string set obtained in step 303 can be calculated using a conventional distance algorithm, and the candidate character string whose character string distance to the target character string falls within the range of the distance threshold is selected and determined as a character string similar to the target character string. Running costs are O(N)*O(M) when the character string distance between the target character string and the candidate character string is calculated, where N is a length of the target character string, and M is a length of the candidate character string.

In addition, before the previous method is performed in the present implementation, prescreening can be performed in another screening method, for example, screening out a candidate character string whose character string length difference with the target character string is greater than a length difference threshold.

Based on the character string distance calculation method in the present implementation, some character strings are screened out from the candidate character string set based on factors such as the bitmap of the character string and the bitmap weight before the character string distance calculation, so that the number of candidate character strings eventually involved in the character string distance calculation is greatly reduced. The character string distance calculation is a calculation process with high running costs and long running time. The running costs are O(N)*O(M). The candidate character strings involved in the character string distance calculation are greatly reduced using the previous method, so that calculation performance is significantly improved. After the actual test, the calculation performance is improved by about 1000 times by applying the method in the present application to a project of calculating address similarity.

Figure 4:
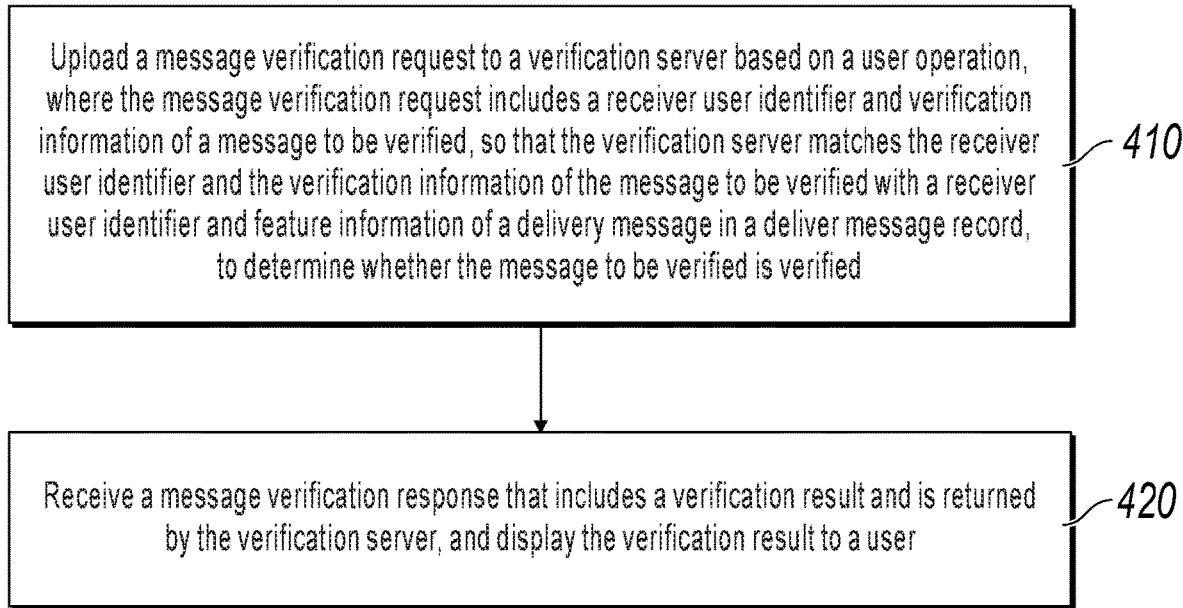
FIG. 4 is a schematic structural diagram illustrating a computing device, according to an example implementation of the present application.

The character string distance calculation method in the implementations of the present application can be executed by a computing device shown in FIG. 4. For example, the computing device can be a server. The computing device can include a processor 410, a communications interface 420, a memory 430, and a bus 440. The processor 410, the communications interface 420, and the memory 430 communicate with each other through the bus 440. An example application scenario can be as follows: When receiving service information including an address character string of a service user, the computing device can use the address character string as a target character string, use a prestored blacklist address library as a candidate character string set, and determine whether the target character string is in the set; and if yes, disallow the user to continue the service.

As shown in FIG. 4, the memory 430 in the computing device can store a logical instruction for character string distance calculation. The memory can be, for example, a non-volatile memory (NVM). The processor 410 can invoke the logical instruction for character string distance calculation in the memory 430, to execute the character string distance calculation method in the implementations of the present application.

The logical instruction for character string distance calculation can be stored in a computer-readable storage medium when functions of the logical instruction are implemented in a form of a software functional unit and are sold or used as an independent product. Based on such an understanding, the technical solutions of the present disclosure essentially, or the part contributing to the existing technology, or some of the technical solutions can be implemented in a form of a software product. The software product is stored in a storage medium, and includes several instructions for instructing a computing device (which can be a personal computer, a server, a network device, etc.) to perform all or some of the steps of the methods described in the implementations of the present disclosure. The previous storage medium includes any medium that can store program code, for example, a USB flash drive, a removable hard disk, a read-only memory (ROM), a random access memory (RAM), a magnetic disk, or an optical disc.

Figure 5:
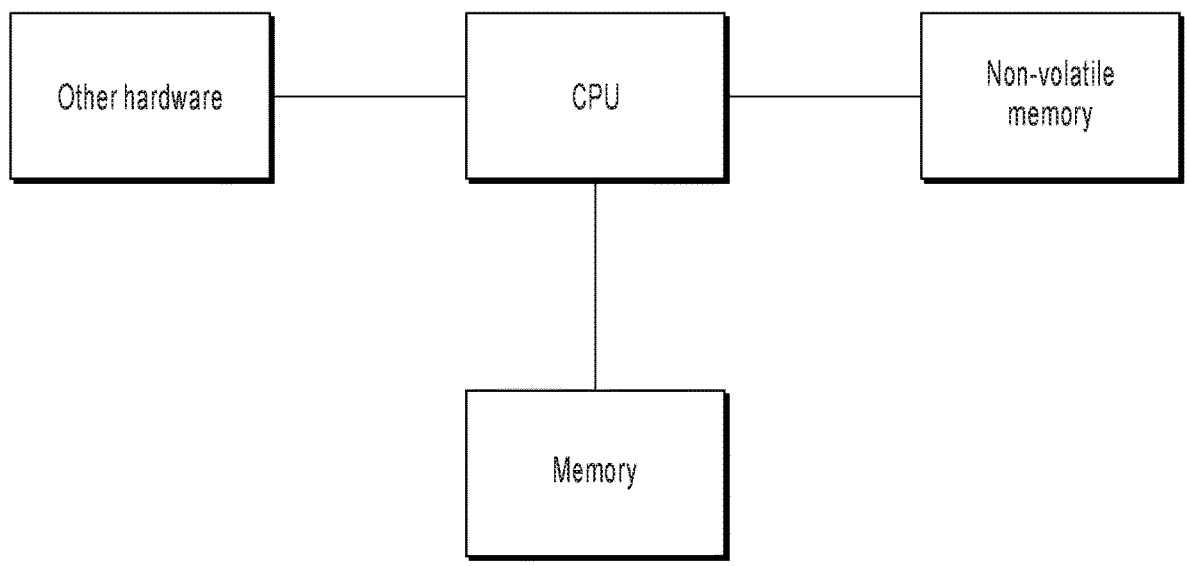
FIG. 5 is a structural diagram illustrating a character string distance calculation device, according to an example implementation of the present application.

The previous logical instruction for character string distance calculation can be referred to as a "character string distance calculation device". The device can be divided into functional modules. As shown in FIG. 5, the device can include an information acquisition module 51 and a screening module 52.

The information acquisition module 51 is configured to obtain association bitmap information of a candidate character string and a target character string. The association bitmap information includes at least one of bitmap weights of two character string bitmaps corresponding to the candidate character string and the target character string, or a bitmap weight of a bitmap difference between two character string bitmaps. The character string bitmap includes a plurality of flag bits. A value of the flag bit includes a first value or a second value. The first value indicates that a predetermined standard character corresponding to the flag bit is included in a character string, and the second value indicates that a predetermined standard character corresponding to the flag bit is not included in the character string. The bitmap weight of the character string bitmap indicates the number of first values in the character string bitmap. The bitmap difference is obtained by performing an exclusive OR operation on a value of each flag bit in the target character string bitmap and a value of a corresponding flag bit in the candidate character string bitmap. The bitmap weight of the bitmap difference indicates the number of flag bits whose exclusive OR values are true in the bitmap difference.

The screening module 52 is configured to screen out, based on the association bitmap information, a candidate character string whose character string distance to the target character string is greater than a distance threshold in the candidate character string set, and calculate a character string distance between each remaining candidate character string and the target character string.

In an example, when the association bitmap information obtained by the information acquisition module 51 includes the bitmap weights of the two character string bitmaps corresponding to the candidate character string and the target character string, the screening module 52 is configured to screen out the candidate character string if a difference between a bitmap weight of the character string bitmap corresponding to the candidate character string and a bitmap weight of the character string bitmap corresponding to the target character string is greater than the distance threshold.

In an example, when the association bitmap information obtained by the information acquisition module 51 includes the bitmap weight of the bitmap difference between the two character string bitmaps corresponding to the candidate character string and the target character string, the screening module 52 is configured to screen out the candidate character string if the bitmap weight of the bitmap difference between the two character string bitmaps is greater than the distance threshold.

Figure 6:
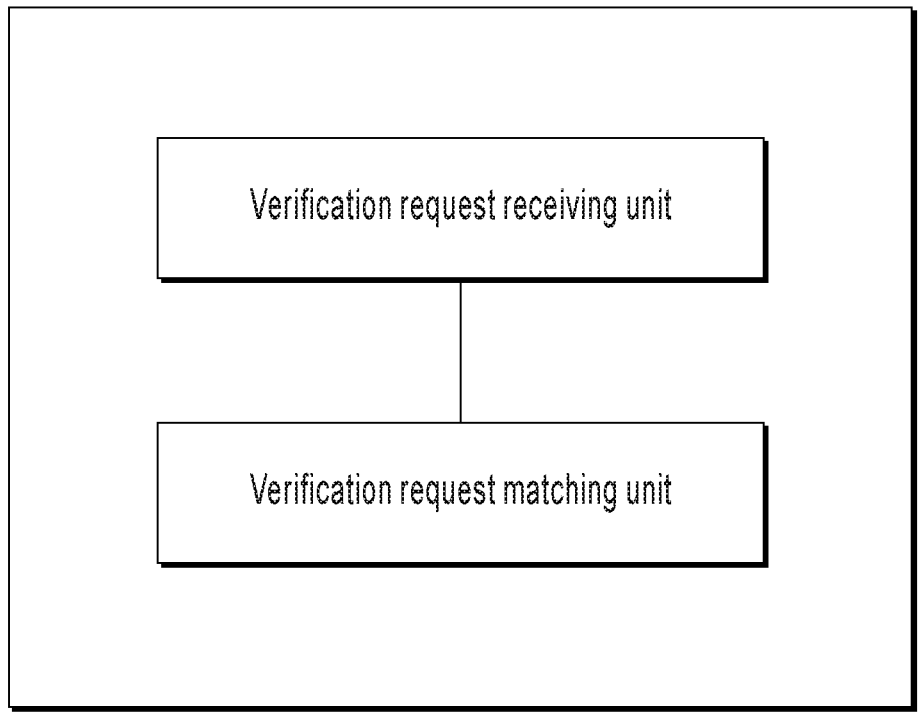
FIG. 6 is a structural diagram illustrating a character string distance calculation device, according to an example implementation of the present application.

In an example, as shown in FIG. 6, the screening module 52 in the device can include a calculation unit 521, a first screening unit 522, a second screening unit 523, and a distance calculation unit 524.

The calculation unit 521 is configured to: when the target character string is given, calculate the character string bitmap and the corresponding bitmap weight of the target character string.

The first screening unit 522 is configured to screen out the candidate character string from the candidate character string set based on the prestored bitmap weight of the character string bitmap of the candidate character string if a difference between the bitmap weight corresponding to the candidate character string and a bitmap weight corresponding to the target character string is greater than the distance threshold, where remaining candidate character strings form a first candidate character string set.

The second screening unit 523 is configured to calculate a bitmap difference between two character string bitmaps of the target character string and each candidate character string in the first candidate character string set, and calculate a bitmap weight of the bitmap difference; and screen out the candidate character string if the bitmap weight of the bitmap difference between the two character string bitmaps of the candidate character string and the target character string is greater than the distance threshold, to obtain a second candidate character string set.

The distance calculation unit 524 is configured to calculate a character string distance between the target character string and each candidate character string in the second candidate character string set.

Figure 7:
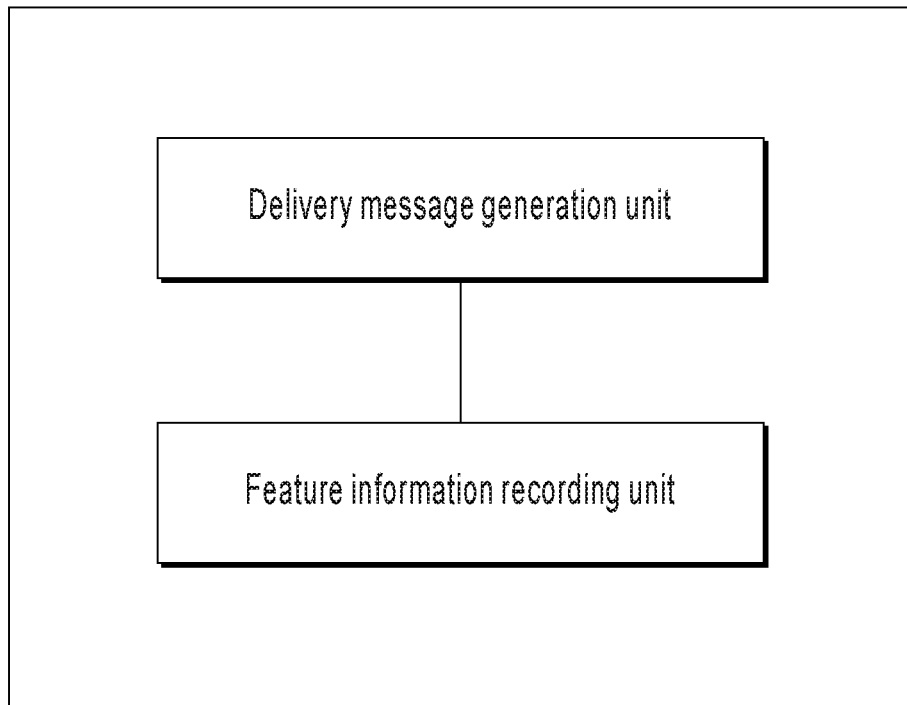
FIG. 7 is a structural diagram illustrating a character string distance calculation device, according to an example implementation of the present application.

The previous "character string distance calculation device" in the logical instruction for character string distance calculation can have a structure shown in FIG. 7. The device can include a difference acquisition module 71 and a distance calculation module 72.

The difference acquisition module 71 is configured to obtain character difference information of characters included in the candidate character string and the target character string.

The distance calculation module 72 is configured to: if the character difference information is greater than a difference threshold, screen out the candidate character string from the candidate character string set, and calculate a character string distance between each remaining candidate character string in the candidate character string set and the target character string.

In an example, the difference acquisition module 71 is configured to obtain a first character quantity and a second character quantity, where the first character quantity indicates the number of different characters included in the candidate character string, and the second character quantity indicates the number of different characters included in the target character string; and calculate a difference between the first character quantity and the second character quantity, and use the difference as the character difference information.

In an example, the difference acquisition module 71 is configured to obtain a third character quantity, where the third character quantity indicates the number of characters included in only one of the candidate character string and the target character string; and use the third character quantity as the character difference information.

In an example, the difference acquisition module 71 is configured to calculate a difference between a first character quantity and a second character quantity, where the first character quantity indicates the number of different characters included in the candidate character string, and the second character quantity indicates the number of different characters included in the target character string; and compare the candidate character string with the target character string, and calculate a third character quantity, where the third character quantity indicates the number of characters included in only one of the candidate character string and the target character string.

The distance calculation module 72 is configured to screen out the candidate character string from the candidate character string set if the difference between the first character quantity and the second character quantity is greater than the difference threshold; and screen out the candidate character string from the candidate character string set if the third character quantity calculated by the difference acquisition module based on a remaining candidate character string in the candidate character string set after the screening is greater than the difference threshold.

Figure 8:
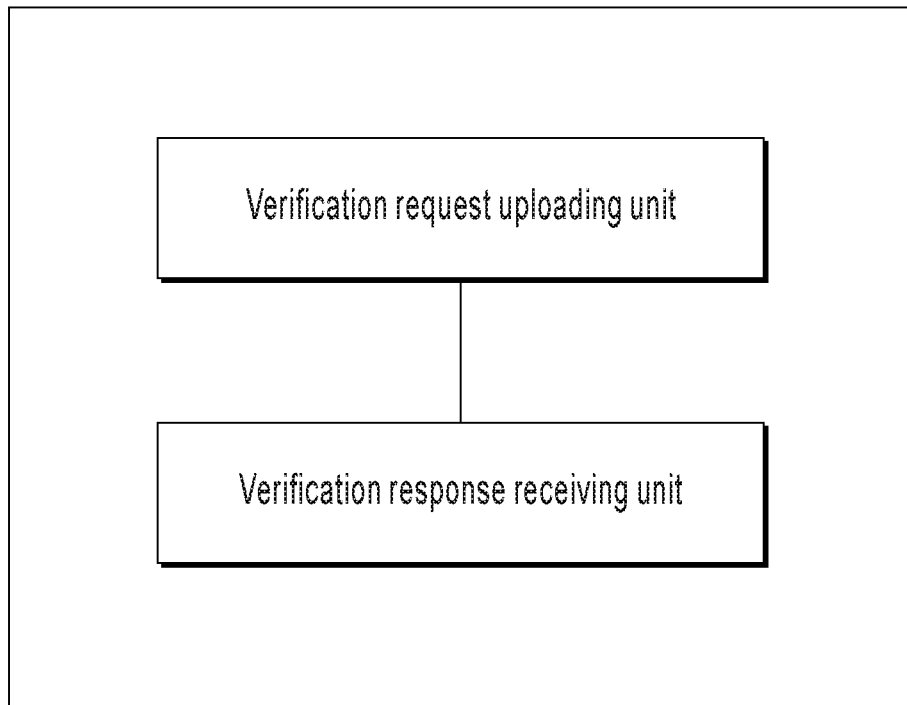
FIG. 8 is a structural diagram illustrating a character string distance calculation device, according to an example implementation of the present application.

As shown in FIG. 8, the difference acquisition module 71 in the device can include a bitmap calculation unit 711 and a difference calculation unit 712.

The bitmap calculation unit 711 is configured to represent the candidate character string and the target character string using character string bitmaps. The character string bitmap includes a plurality of flag bits. A value of the flag bit includes a first value and a second value. The first value indicates that a predetermined standard character corresponding to the flag bit is included in a character string, and the second value indicates that a predetermined standard character corresponding to the flag bit is not included in the character string.

The difference calculation unit 712 is configured to obtain the character difference information based on the character string bitmaps.

In an example, the difference calculation unit 712 is configured to calculate bitmap weights of the two character string bitmaps corresponding to the candidate character string and the target character string, where the bitmap weight of the character string bitmap indicates the number of first values in the character string bitmap; and calculate a difference between the bitmap weight of the character string bitmap corresponding to the candidate character string and the bitmap weight of the character string bitmap corresponding to the target character string.

In an example, the difference calculation unit 712 is configured to perform an exclusive OR operation on a value of each flag bit in the target character string bitmap and a value of a corresponding flag bit in the candidate character string bitmap, to obtain a bitmap difference; and calculate a bitmap weight of the bitmap difference, where the bitmap weight indicates the number of flag bits whose exclusive OR values are true in the bitmap difference.

In an example, the difference threshold is a distance threshold for a character string distance.

The previous descriptions are merely example implementations of the present application, but are not intended to limit the present application. Any modification, equivalent replacement, or improvement made without departing from the spirit and principle of the present application should fall within the protection scope of the present application.

Figure 9:
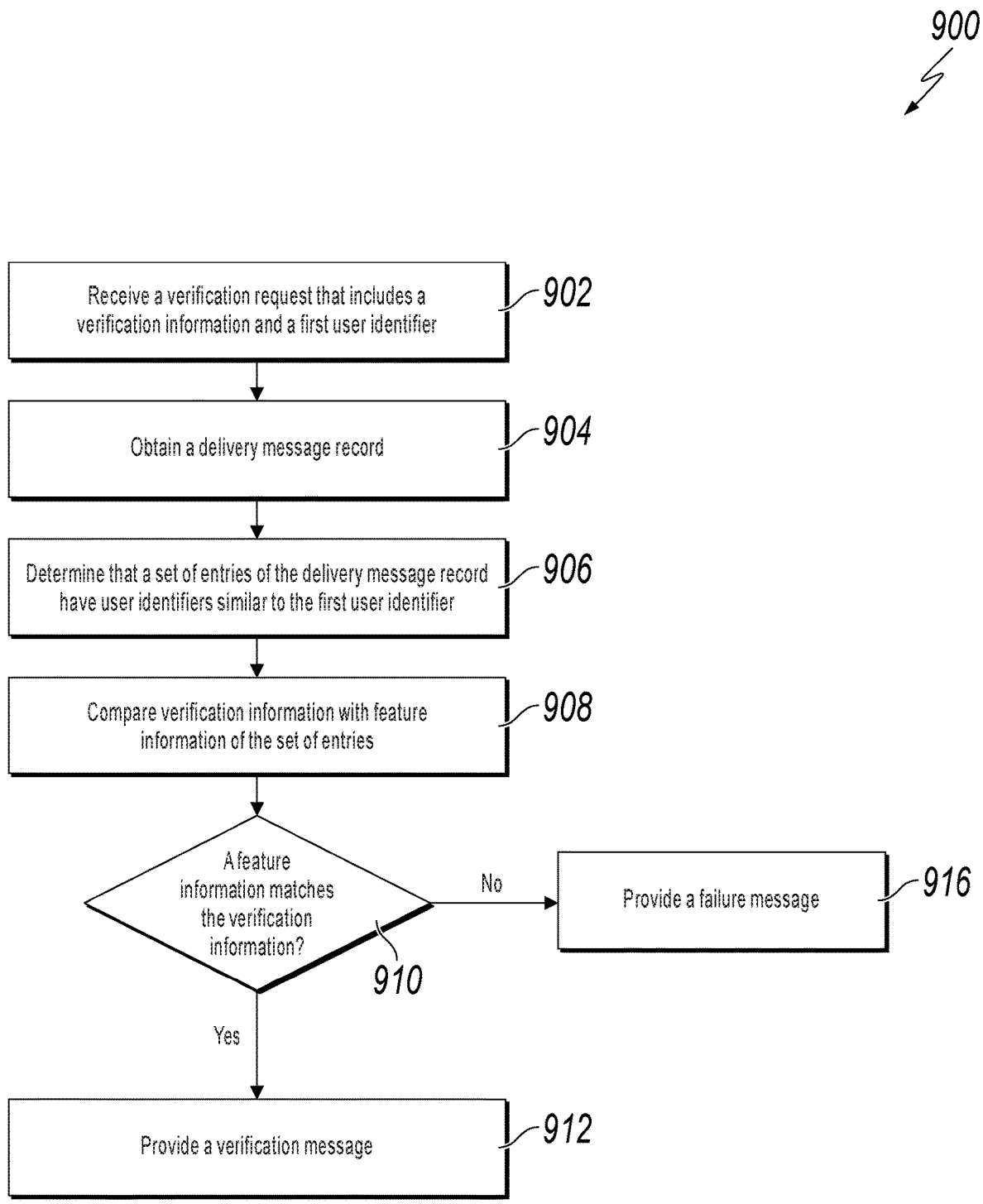
FIG. 9 is a flowchart illustrating an example of a computer-implemented method for character string difference determination, according to an implementation of the present disclosure.

FIG. 9 is a flowchart illustrating an example of a computer-implemented method 900 for character string difference determination, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. For example, method 900 can be performed by any of the character string distance calculation devices presented in FIGS. 5 and 7. In some implementations, various steps of method 900 can be run in parallel, in combination, in loops, or in any order.

At 902, a target character string is received. The target character string can be provided by a user or by a computing device. For example, the target character string can be a query, a username, a secret code, etc. entered by a user. An example target character string can be ABD. From 902, method 900 proceeds to 904.

At 904, the characters in the target character string is compared to characters in a model character string to produce a target bitmap. The model character string includes a sequence of a plurality of characters. The model character string can be a string of English letters, numbers, signs, etc. For example, a model character string may include 26 English letters (e.g., ABC . . . YZ). The target bitmap includes a plurality of flag bits with values that are associated with the characters of the target character string. The target bitmap indicates characters that are common between the target character string and the model character string. In some implementations, each flag bit in the target bitmap can have a first value or a second value (e.g., 1 or 0). A flag bit having a first value indicates that a respective character in the target character string matches a corresponding character in the model character string. A flag bit having a second value indicates that the respective character in the target character string does not match the corresponding character in the model character string. For example, a target bitmap for the target bitmap string ABD can be 110100 based on an example model character string of ABCDEF. From 904, method 900 proceeds to 906.

At 906, a target bitmap weight is calculated. The target bitmap weight indicate a number of flag bits that have the first value in the target bitmap. The target bitmap can be calculated by counting number of flag bits that have the first value in the target bitmap. For example, target bitmap weight for the target bitmap 110100 (in the example above) is 3, as three flag bits in the target bitmap have a first value of 1. From 906, method 900 proceeds to 908.

At 908, a candidate bitmap and a candidate bitmap weight are obtained. the candidate bitmap and the candidate bitmap weight are associated with a candidate character string. The candidate character string can be stored in a data storage and can be associated with one or more services. In some implementations, the candidate bitmap and/or the candidate bitmap weight are retrieved from a data storage. For example, the candidate bitmap can be stored in a bitmap column and the candidate bitmap weight can be stored in a bitmap weight column of the data storage. One or more indexes can be used to associate the candidate bitmap and/or the candidate bitmap weight to the candidate character string. In some implementations, the candidate bitmap is obtained by comparing characters in the candidate character string to characters in a model character string that includes a sequence of a plurality of characters.

The candidate bitmap includes a plurality of flag bits that are associated with the characters of the candidate character string. Similar to flag bits in the target character string, the flag bits in the candidate character string can include the first and the second value. The first value of a flag bit on the candidate bitmap indicates that a respective character in the candidate character string matches a corresponding character in the model character string. The second value of the flag bit on the candidate bitmap indicates that a respective character in the character string does not match a corresponding character in the model character string. The candidate bitmap weight indicates number of flag bits that have the first value in the candidate bitmap. For example, using the example model character string ABCDEF provided above, candidate bitmap and candidate bitmap weight for a candidate character string CD is 001100 and 2, respectively. From 908, method 900 proceeds to 910.

At 910, a determination is made as to whether the candidate bitmap weight differs from the target bitmap weight for less than a first threshold value. If it is determined that the candidate bitmap weight differs from the target bitmap weight for less than the first threshold value, method 900 proceeds to 914. Otherwise, if it is determined that the candidate bitmap weight differs from the target bitmap weight for greater than or equal to the first threshold value, method 900 proceeds to 912. For the example target character string ABD and the example candidate character string CD provided above, the difference between the target and candidate bitmap weight is 1 (i.e., 3−2=1). Thus, in case that the first threshold value is set to 2, the difference is less than the first threshold value and the method 900 proceeds to 914. In case that the first threshold value is set to 1 (or 0), the difference between the candidate and the target character strings is too high and the candidate character string is considered as "obviously different" from the target character string. In such case, from 910, the method 900 proceeds to 912.

At 914, the candidate character string is included in (or added to) a first set of candidate character strings. From 914, method 900 proceeds to 916.

At 916, an exclusive OR ("XOR") operation is performed between the candidate bitmap and the target bitmap. The result of the exclusive OR will be a string of bits. Each bit in the result (also referred to as "bitmap difference," herein) has a value of 0 if the respective flag bit in the target and the candidate bitmap have the same value (e.g., both have the first value), and has a value of 1 if the respective flag bit in the two bitmaps have different values (e.g., one has the first value and the other has the second value). In the example provided above, the bitmap difference between the target character string 110100 and the candidate character string 001100, is 111000. From 916, method 900 proceeds to 918.

At 910, a determination is made as to whether number of bits with value of 1 in the XOR result (or "the bitmap difference") is less than a second threshold. If it is determined that number of is in the XOR result is greater than or equal to the second threshold value, the method 900 proceeds to 912. Otherwise, if it is determined that number of 1s in the XOR result is less than the second threshold value, method 900 proceeds to 920. In the example above, since there are three 1s in the XOR result, if the second threshold value is 2, the method proceeds to 912. However, if the second threshold value is 4, the method proceeds to 920.

At 920, the candidate character string is included in a second set of candidate character strings. Character strings in the second set of candidate character strings can be inputted to a distance calculation algorithm to determine one or more candidate character strings closest to the target character string. For example, from 920, method 900 can optionally proceed to 922, where character string distance between the candidate character string and the target character string is calculated.

As explained above, if it is determined that the candidate bitmap weight differs from the target bitmap weight for greater than (or equal to) a first threshold value, or if it is determined that number of is in the XOR result is greater than (or equal to) a second threshold value, method 900 proceeds to 912. The method 900 proceeding to 912 indicates that the candidate character string is considered as "obviously different" from the target character string and should not be inputted to a distance calculation algorithm. At 912, the method moves to another character string. For example, the candidate character string can be a first character string included in a plurality of character strings stored in a data storage and at 912, the method 900 moves from the first character string to a second character string (e.g., a next character string) in the plurality of character strings. From 912, the method 900 returns to 908, where the method obtains a candidate bitmap and a candidate bitmap weight associated with the second character string.

In case that all character strings in the plurality of character strings have been checked by the method 900, the method stops. In some implementations, when all character strings have been checked, the method 900 provides the second set of candidate character strings so that character string distance between the target character string and character strings of the second set of candidate character strings can be calculated. For example, the second set of candidate character strings can be provided to a distance calculation algorithm executed on the distance calculation module 524 (FIG. 5) to determine one or more closest character strings to the target character string. Since the second set of candidate character string is a subset of the plurality of character strings, running time for performing the distance calculation is improved as compared to when all character strings in the plurality of character strings are inputted to a distance calculation module.

The running time can be further improved by applying other techniques that would reduce the number of character strings that is to be used in the distance calculation. For example, in some implementations, length of the character strings in the plurality of character strings are compared to the length of the target character string. If the difference between length of a candidate character string and the target character string is greater than a third threshold value, the candidate character string is considered as obviously different from the target character string and is removed from the candidate character strings that are to be compared to the target character string for distance calculation. In these implementations, the character string difference determination method moves to a next candidate character string in the plurality of character strings in response to determining that the difference between length of a first character string and length of the target character string is greater than a third threshold value.

Character string distance calculation is used to determine the similarity between two character strings. For example, a computing system may use a character string distance calculation to identify content of a target character string (e.g., a query entered by a user). Conventional systems compare the target character string to a set of candidate character strings stored in a data storage to determine the closest character string(s) in the set to the target character string. Each candidate character string in the data storage may be associated with one or more services that the system would provide upon determining that the target character string is associated with the respective candidate character string. The larger the set of candidate character strings in the data storage is, the more variety of services the system can provide. In addition, larger set of candidate character strings improves precision in identifying a correct service (or service details). However, a large set of character string also causes a long running time for character string distance calculation.

Implementations of the present disclosure provide techniques to improve running time of character string distance calculation. The implementations can be added to conventional distance calculation algorithms to improve the algorithms' running time. The implementations improve the running time by reducing number of candidate character strings in the set of candidate character strings on which a distance calculation algorithm is to be performed. The number of candidate character strings is reduced by filtering character strings that are "obviously different" from the target character string. Such reduction is performed based on the characters included in the candidate character string as compared to the target character string. For example, when the difference between the characters in a candidate character string and the target character string is more than a threshold value, the candidate character string is removed from a set of character strings on which the distance calculation algorithm is to be performed. Accordingly, the implementations improve running time without sacrificing accuracy of the distance calculation algorithms.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by a system of one or more computers, the method comprising:
   receiving a target character string;
   comparing target characters in the target character string to model characters in a model character string that comprises a sequence of a plurality of characters to produce a target bitmap indicating characters that are common between the target character string and the model character string, the target bitmap comprising a plurality of first flag bits, each first flag bit being associated with a respective character of the target character string and having a first value or a second value, wherein a first flag bit having the first value indicates that a respective target character in the target character string matches a corresponding model character in the model character string, and the first flag bit having the second value indicates that a respective target character in the target character string is different from a corresponding model character in the model character string;
   calculating a target bitmap weight associated with the target character string, the target bitmap weight indicating a number of first flag bits that have the first value in the target bitmap;
   obtaining an initial candidate bitmap and an initial candidate bitmap weight associated with an initial candidate character string, the initial candidate bitmap comprising two character string bitmaps;
   determining that the two character string bitmaps of the initial candidate bitmap weight differs from the target bitmap weight by more than a distance threshold value;
   determining that the initial candidate bitmap weight differs from the target bitmap weight by more than a first threshold value;
   in response to determining that the two character string bitmaps of the initial candidate bitmap weight differs from the target bitmap weight by more than a distance threshold value and in response to determining that the initial candidate bitmap weight differs from the target bitmap weight by more than the first threshold value, screening out the initial candidate bitmap;
   obtaining a candidate bitmap and a candidate bitmap weight associated with a candidate character string, the candidate bitmap comprising a plurality of second flag bits, each second flag bit having the first value or the second value, the candidate bitmap weight indicating a number of second flag bits that have the first value in the candidate bitmap;
   determining that the candidate bitmap weight differs from the target bitmap weight by less than the first threshold value;
   in response to determining that the candidate bitmap weight differs from the target bitmap weight by less than the first threshold value, adding the candidate character string in a first set of candidate character strings;

performing an exclusive OR operation to provide a bitmap-difference associated with the candidate character string, the exclusive OR operation being performed between the target bitmap and the candidate bitmap;
determining that a number of ones in the bitmap-difference is less than a second threshold value;
in response to determining that the number of ones in the bitmap-difference is less than a second threshold value, adding the candidate character string in a second set of candidate character strings;
calculating a character string distance between the target character string and each character string in the second set of candidate character strings;
generating a message verification response based on the character string distance between the target character string and each character string in the second set of candidate character strings; and
displaying the message verification response.

2. The computer-implemented method of claim 1, further comprising:
determining one or more closest character strings from the second set of candidate character strings to the target character string based on the character string distance.

3. The computer-implemented method of claim 1, wherein the candidate character string is included in a plurality of character strings and the method further comprises:
comparing a length of the candidate character string with a target length of the target character string; and
moving to a next character string from the plurality of character strings in response to determining that the length of the candidate character string differs from the target length of the target character string for more than a third threshold value.

4. The computer-implemented method of claim 1, wherein obtaining the candidate bitmap includes comparing characters in the candidate character string to model characters in a model character string that includes a sequence of a plurality of characters, wherein the first value of a flag bit on the candidate bitmap indicates that a respective character in the candidate character string matches a corresponding model character in the model character string, and the second value of the flag bit on the candidate bitmap indicates that a respective character in the candidate character string does not match a corresponding model character in the model character string.

5. The computer-implemented method of claim 1, wherein the candidate character string is included in a plurality of character strings and the method further comprises:
in response to determining that the candidate bitmap weight differs from the target bitmap weight by more than the first threshold value or is equal to the first threshold value, moving to a second character string in the plurality of character strings.

6. The computer-implemented method of claim 5, wherein the method further comprises:
in response to determining that the number of ones on the bitmap-difference is greater than the second threshold value or is equal to the second threshold value, moving to the second character string in the plurality of character strings.

7. The computer-implemented method of claim 1, wherein the first value is 1 and the second value is 0.

8. A non-transitory, computer-readable medium storing one or more instructions executable by a computer system to perform operations comprising:
receiving a target character string;
comparing target characters in the target character string to model characters in a model character string that comprises a sequence of a plurality of characters to produce a target bitmap indicating characters that are common between the target character string and the model character string, the target bitmap comprising a plurality of first flag bits, each first flag bit being associated with a respective character of the target character string and having a first value or a second value, wherein a first flag bit having the first value indicates that a respective target character in the target character string matches a corresponding model character in the model character string, and the first flag bit having the second value indicates that a respective target character in the target character string is different from a corresponding model character in the model character string;
calculating a target bitmap weight associated with the target character string, the target bitmap weight indicating a number of first flag bits that have the first value in the target bitmap;
obtaining an initial candidate bitmap and an initial candidate bitmap weight associated with an initial candidate character string, the initial candidate bitmap comprising two character string bitmaps;
determining that the two character string bitmaps of the initial candidate bitmap weight differs from the target bitmap weight by more than a distance threshold value;
determining that the initial candidate bitmap weight differs from the target bitmap weight by more than a first threshold value;
in response to determining that the two character string bitmaps of the initial candidate bitmap weight differs from the target bitmap weight by more than a distance threshold value and in response to determining that the initial candidate bitmap weight differs from the target bitmap weight by more than the first threshold value, screening out the initial candidate bitmap;
obtaining a candidate bitmap and a candidate bitmap weight associated with a candidate character string, the candidate bitmap comprising a plurality of second flag bits, each second flag bit having the first value or the second value, the candidate bitmap weight indicating a number of second flag bits that have the first value in the candidate bitmap;
determining that the candidate bitmap weight differs from the target bitmap weight by less than the first threshold value;
in response to determining that the candidate bitmap weight differs from the target bitmap weight by less than the first threshold value, adding the candidate character string in a first set of candidate character strings;
performing an exclusive OR operation to provide a bitmap-difference associated with the candidate character string, the exclusive OR operation being performed between the target bitmap and the candidate bitmap;
determining that a number of ones in the bitmap-difference is less than a second threshold value;
in response to determining that the number of ones in the bitmap-difference is less than a second threshold value, adding the candidate character string in a second set of candidate character strings;

calculating a character string distance between the target character string and each character string in the second set of candidate character strings;

generating a message verification response based on the character string distance between the target character string and each character string in the second set of candidate character strings; and displaying the message verification response.

9. The non-transitory, computer-readable medium of claim 8, wherein the operations further comprise:

determining one or more closest character strings from the second set of candidate character strings to the target character string based on the character string distance.

10. The non-transitory, computer-readable medium of claim 8, wherein the candidate character string is included in a plurality of character strings and the operations further comprise:

comparing a length of the candidate character string with a target length of the target character string; and moving to a next character string from the plurality of character strings in response to determining that the length of the candidate character string differs from the target length of the target character string for more than a third threshold value.

11. The non-transitory, computer-readable medium of claim 8, wherein obtaining the candidate bitmap includes comparing characters in the candidate character string to model characters in a model character string that includes a sequence of a plurality of characters, wherein the first value of a flag bit on the candidate bitmap indicates that a respective character in the candidate character string matches a corresponding model character in the model character string, and the second value of the flag bit on the candidate bitmap indicates that a respective character in the candidate character string does not match a corresponding model character in the model character string.

12. The non-transitory, computer-readable medium of claim 8, wherein the candidate character string is included in a plurality of character strings and the operations further comprise:

in response to determining that the candidate bitmap weight differs from the target bitmap weight by more than the first threshold value or is equal to the first threshold value, moving to a second character string in the plurality of character strings.

13. The non-transitory, computer-readable medium of claim 12, wherein the operations further comprises:

in response to determining that the number of ones on the bitmap-difference is greater than the second threshold value or is equal to the second threshold value, moving to the second character string in the plurality of character strings.

14. The non-transitory, computer-readable medium of claim 8, wherein the first value is 1 and the second value is 0.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving a target character string;

comparing target characters in the target character string to model characters in a model character string that comprises a sequence of a plurality of characters to produce a target bitmap indicating characters that are common between the target character string and the model character string, the target bitmap comprising a plurality of first flag bits, each first flag bit being associated with a respective character of the target character string and having a first value or a second value, wherein a first flag bit having the first value indicates that a respective target character in the target character string matches a corresponding model character in the model character string, and the first flag bit having the second value indicates that a respective target character in the target character string is different from a corresponding model character in the model character string;

calculating a target bitmap weight associated with the target character string, the target bitmap weight indicating a number of first flag bits that have the first value in the target bitmap;

obtaining an initial candidate bitmap and an initial candidate bitmap weight associated with an initial candidate character string, the initial candidate bitmap comprising two character string bitmaps;

determining that the two character string bitmaps of the initial candidate bitmap weight differs from the target bitmap weight by more than a distance threshold value;

determining that the initial candidate bitmap weight differs from the target bitmap weight by more than a first threshold value;

in response to determining that the two character string bitmaps of the initial candidate bitmap weight differs from the target bitmap weight by more than a distance threshold value and in response to determining that the initial candidate bitmap weight differs from the target bitmap weight by more than the first threshold value, screening out the initial candidate bitmap;

obtaining a candidate bitmap and a candidate bitmap weight associated with a candidate character string, the candidate bitmap comprising a plurality of second flag bits, each second flag bit having the first value or the second value, the candidate bitmap weight indicating a number of second flag bits that have the first value in the candidate bitmap;

determining that the candidate bitmap weight differs from the target bitmap weight by less than the first threshold value;

in response to determining that the candidate bitmap weight differs from the target bitmap weight by less than the first threshold value, adding the candidate character string in a first set of candidate character strings;

performing an exclusive OR operation to provide a bitmap-difference associated with the candidate character string, the exclusive OR operation being performed between the target bitmap and the candidate bitmap;

determining that a number of ones in the bitmap-difference is less than a second threshold value;

in response to determining that the number of ones in the bitmap-difference is less than a second threshold value, adding the candidate character string in a second set of candidate character strings;

calculating a character string distance between the target character string and each character string in the second set of candidate character strings;

generating a message verification response based on the character string distance between the target character string and each character string in the second set of candidate character strings; and displaying the message verification response.

16. The computer-implemented system of claim 15, wherein the operations further comprise:

determining one or more closest character strings from the second set of candidate character strings to the target character string based on the character string distance.

17. The computer-implemented system of claim 15, wherein the candidate character string is included in a plurality of character strings and the operations further comprise:

comparing a length of the candidate character string with a target length of the target character string; and moving to a next character string from the plurality of character strings in response to determining that the length of the candidate character string differs from the target length of the target character string for more than a third threshold value.

18. The computer-implemented system of claim 15, wherein obtaining the candidate bitmap includes comparing characters in the candidate character string to model characters in a model character string that includes a sequence of a plurality of characters, wherein the first value of a flag bit on the candidate bitmap indicates that a respective character in the candidate character string matches a corresponding model character in the model character string, and the second value of the flag bit on the candidate bitmap indicates that a respective character in the candidate character string does not match a corresponding model character in the model character string.

19. The computer-implemented system of claim 15, wherein the candidate character string is included in a plurality of character strings and the operations further comprise:

in response to determining that the candidate bitmap weight differs from the target bitmap weight by more than the first threshold value or is equal to the first threshold value, moving to a second character string in the plurality of character strings.

20. The computer-implemented system of claim 19, wherein the operations further comprise:

in response to determining that the number of ones on the bitmap-difference is greater than the second threshold value or is equal to the second threshold value, moving to the second character string in the plurality of character strings.

* * * * *